May 17, 1932. P. A. BERTAUT 1,858,799
GASOLINE TANK PROTECTOR
Filed Jan. 23, 1931
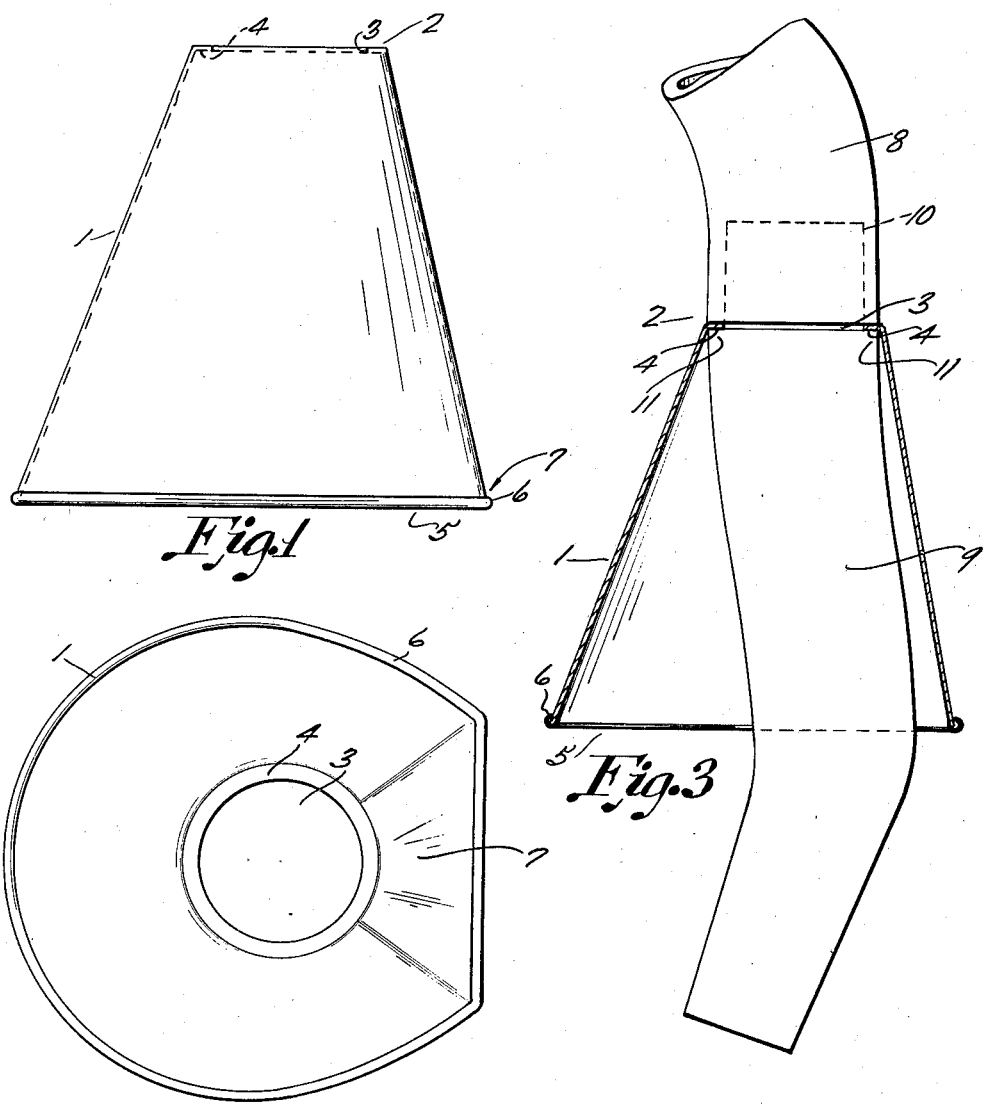
Inventor
Paul A. Bertaut
By Adam E. Fisher
Attorney Patented May 17, 1932

1,858,799

UNITED STATES PATENT OFFICE

PAUL A. BERTAUT, OF EAU GALLIE, FLORIDA

GASOLINE TANK PROTECTOR

Application filed January 23, 1931. Serial No. 510,706.

This invention relates to gasoline tank protectors and the main object is to provide a protector for application to the nozzle of the hose of a gasoline pump to exclude water, dust and the like from the gasoline tank of an automobile while filling the same with gasoline.

Another object is to provide a device of this nature in a simple, inexpensive and efficient form and which may be readily applied to or removed from the nozzle of the hose.

The foregoing and other objects together with means whereby the same may be carried into effect will be understood from the following description of a preferred embodiment of the invention taken in connection with the accompanying drawings wherein:

Figure 1 is a side view of the protector.

Figure 2 is an inverted plan view thereof.

Figure 3 is a cross section through the protector showing the same mounted on the nozzle of a gasoline pump hose.

Referring now more particularly to the drawings, my invention comprises a bell or hood 1 of metal formed in the general shape of a truncated hollow cone with its smaller end 2 provided with an aperture 3 and an inwardly extending lip or flange 4. The larger end 5 of the bell 1 is beaded or rolled around its edge and this beaded edge is enclosed in rubber or similar relatively resilient or soft material as shown at 6. One side of the bell or hood 1 adjacent the larger end 5 is flattened and inset as designated at 7 so that a center line dropped from the smaller end 2 falls to one side of the center of the larger end 5, the said smaller end being thus in effect set eccentrically with respect to the larger end for a purpose to be described.

In Figure 3 the conventional gasoline pump hose is indicated at 8 and the conventional nozzle at 9, the nozzle being secured to the end of the hose by the reduced shank 10 which is screwed into the end of the hose. In applying my invention to the hose and nozzle, the nozzle is first removed and passed upwardly through the bell 1 with its shank 10 passed through the aperture 3 which is of the proper size to receive the said shank. The nozzle 9 is then replaced in the hose and drawn up tight gripping the lip or flange 4 between the end of the hose and the shoulder 11 on the nozzle formed by the reduced shank 10. The bell 1 is thus securely held in place on the end of the hose 8 and over the nozzle 9, the said nozzle however extending for some distance from the larger open end 5 of the bell so that it may be inserted in the filler hole of a gasoline tank. In use the nozzle is inserted in the tank in the usual manner until the end 5 contacts the same whereby rain, dust or the like cannot enter the tank as will be understood. Since this lower edge 5 has the rubber covering 6 it cannot scratch or otherwise mar the surface of tank or automobile. The inset flattened side 7 of the bell 1 allows the nozzle to be inserted in a filler hole located close to the body of the automobile where the remaining rounded portion of the bell would otherwise prevent such action as would be understood.

From the foregoing it will be apparent that I have provided a simple and efficient device for the purpose intended and one which may be readily applied to or removed from the hose or nozzle.

While I have herein set forth a certain preferred embodiment of the invention it is understood that I may vary from the same in minor structural details, not departing from the spirit of the invention and within the scope of the appended claims.

I claim:

1. In a device of the kind described, in combination with a pump hose including a nozzle threaded on a reduced shank in the end of the hose, a cone shaped bell having an aperture in its smaller end and an inwardly extended lip around the said aperture and adapted to fit over the said reduced shank between the hose and nozzle.

2. In a device of the kind described, a bell in the form of a truncated cone having an aperture in its upper and smaller end, the larger end of the bell being flattened and straightened at one side, and the aperture in the upper smaller end of the bell being eccentrically located in a direction toward and over the said flattened side.

In testimony whereof I affix my signature.

PAUL A. BERTAUT.